May 16, 1939.   B. J. ANDERSON   2,158,170

REAR FRAME MEMBER

Filed March 8, 1937

BERT J. ANDERSON
INVENTOR.

BY Leon T. Hooper
ATTORNEY.

Patented May 16, 1939

2,158,170

UNITED STATES PATENT OFFICE 2,158,170

REAR FRAME MEMBER

Bert J. Anderson, Hammond, Ind.

Application March 8, 1937, Serial No. 129,535

7 Claims. (Cl. 280—291)

This invention relates to an improved rear frame member for velocipedes and has for one of its principal objects the provision of means for economically producing a device of the kind referred to which is exceptionally sturdy and rugged although exceedingly light in weight.

Another important object of the device of this invention resides in the provision of means whereby a backbone or reach member may be secured to the device.

A still further object of importance and advantage is the provision of means for securing an axle to the under surface of the member.

Still another important object of advantage resides in the provision of means whereby the improved rear frame members of this invention may be employed with and become a part of velocipedes of various sizes.

An additional object of importance and advantage is the provision of means for utilizing the entire length of the improved rear frame member for maintaining an axle in operable alignment therewith.

Additional objects of advantage and importance will become apparent as the following detailed description progresses reference being had to the accompanying drawing which illustrates a preferred embodiment of the invention and wherein, Fig. 1 is a top plan view of a rear frame member which embodies the invention.

Figure 1:
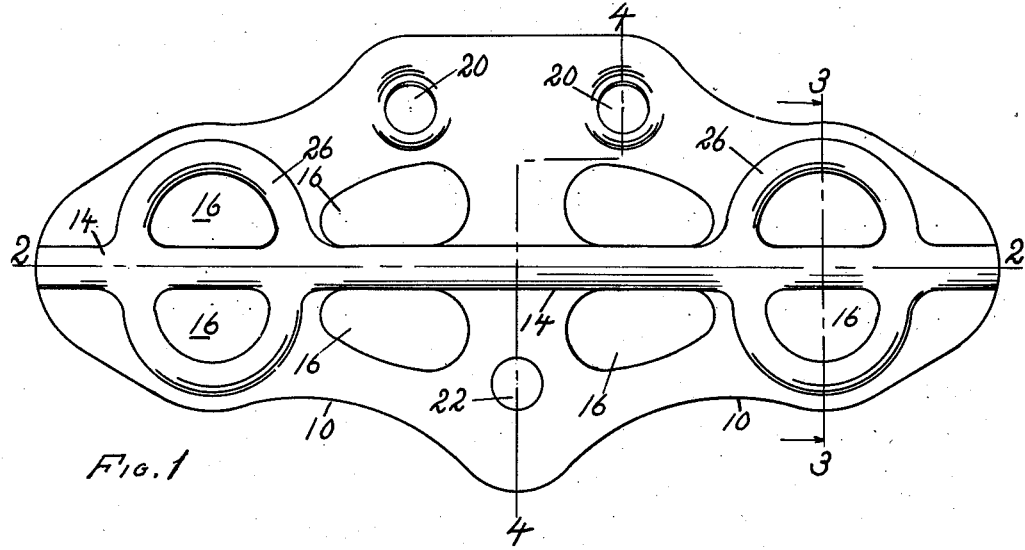
Figure 2:
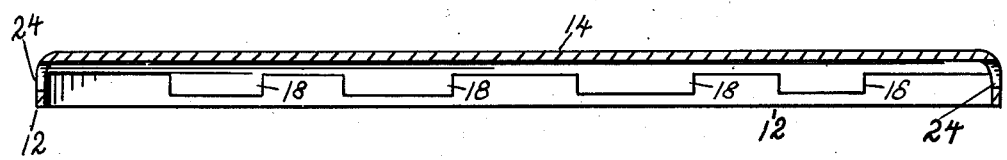
Fig. 2 is a longitudinal section taken on line 2—2 of Fig. 1.
Figure 3:
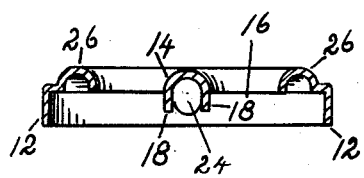
Fig. 3 is a transverse section taken on line 3—3 of Fig. 1.
Figure 4:
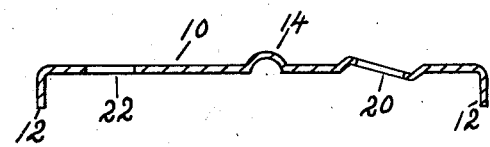
Fig. 4 is a transverse section taken on line 4—4 of Fig. 1.
Figure 5:
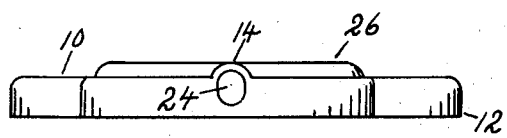
Fig. 5 is an end elevational view of the device.

The reference numeral 10 indicates in general a stamping which in the preferred embodiment of the invention has downwardly turned edges 12. The stamping 10 is preferably of greater length than width as is clearly shown in the drawing. However, changes in form to meet various requirements may be made without departing from the teachings here set forth.

Extending from one end of the stamping to the opposite end is a raised or embossed portion 14 which is substantially semi-circular in cross section as is clearly shown in the drawing. The under surface of the raised portion 14 is adapted to rest upon and conform to the shape of an axle.

Formed on each side of the embossed portion 14, closely adjacent thereto, is a plurality of apertures 16, 16.

In the preferred embodiment of the invention, portions of the edges of the embossed portion 14 are turned downwardly from the apertures 16, 16 to provide a crimping means for rigidly securing an axle to the stamping 10. The downwardly turned portions of the edges are indicated by the reference numeral 18, 18.

Formed in the stamping near the forward central portion are two circular apertures 20. In the preferred embodiment of the invention, as illustrated in the drawing, the apertures 20 are formed at a slight angle to the upper surface of the stamping 10. The angle is obtained by depressing the forward edge of the apertures and elevating the rear edge.

Formed in the stamping on the transverse center line and intermediate the longitudinal center line and the rear edge of the stamping is an aperture 22. The aperture 22 may be formed slightly to the front or to the rear of the location shown in Fig. 1 to accommodate backbones or reach members of various sizes. The apertures 20 and 22 provide a means for securing a backbone to the improved rear frame member.

An aperture 24 in each downwardly turned end is provided to receive an axle.

An embossed or raised standing surface 26 is provided intermediate the center and each end of the stamping 10.

While the improved rear frame member of this invention is especially designed and adapted to be associated with the velocipede set forth and described in my copending application Serial No. 123,501, filed February 1, 1937, it will be apparent that its use is by no means restricted to such employment.

It will be apparent from the foregoing that herein is provided a rear frame member which readily lends itself to the slight change necessary for association with backbones or reach members of various sizes and designs.

It will be further apparent that herein is provided a rear frame member to which an axle may be rigidly and permanently secured without resorting to welding or other conventional means known to the art. However, it will be apparent that welding, riveting or other means may be employed for securing the members together.

Furthermore the groove in the rear frame member provides an extensive bearing surface which conforms in shape to a part of the peripheral surface of an axle and because of the close association between an axle and the stamping a very rigid and sturdy device is produced.

I am aware that many changes may be made and numerous details of construction varied throughout a wide range without departing from the principles of this invention and I, therefore, do not propose limiting the patent granted hereon other than is necessitated by the prior art and the express limitation contained in the following claims.

I claim as my invention:

1. A rear frame member for velocipedes comprising a substantially flat stamped member having an axle receiving groove extending from one end to the other end of the stamping, and portions of the member closely adjacent each side of said groove being adapted to be crimped beneath an axle.

2. A rear frame member for velocipedes comprising a substantially flat stamping having downwardly turned ends, an axle receiving opening in each downwardly turned end, and a groove formed in the under surface of said stamping, portions of stamping closely adjacent each side of said groove being adapted to be crimped beneath an axle, said groove being in alignment with said axle receiving openings.

3. A rear frame member for velocipedes comprising a relatively flat stamping and means formed of portions of said stamping for securing an axle thereto, said means including two or more downwardly projecting lugs which are adapted to be crimped about an axle.

4. A rear frame member for velocipedes comprising a substantially flat stamped member, the central longitudinal portion of said member being raised, and aligned portions of the stamped member on each side of said raised portion extending downwardly and being adapted to be crimped against an axle.

5. A rear frame member for velocipedes comprising a stamping having downwardly turned edges and ends, each of said ends being provided with an axle receiving opening, said stamping being provided with means to receive portions of a backbone therethrough, an axle receiving groove formed in the bottom surface of said stamping, and aligned portions of the stamping on each side of said groove being adapted to be crimped below an axle.

6. A rear frame member for velocipedes comprising a relatively flat apertured stamping, certain parts of said stamping adjacent the longitudinal center line thereof projecting downwardly to provide crimpable tongue means whereby an axle may be secured to the stamping.

7. A rear frame member for velocipedes comprising a substantially flat stamped member, the central longitudinal portion of said member being raised to form an axle receiving groove along the lower surface of said member, and portions of the stamped member on each side of said raised portion comprising downwardly extending crimpable tongues.

BERT J. ANDERSON.